United States Patent [19]
Fry

[11] Patent Number: 5,106,207
[45] Date of Patent: Apr. 21, 1992

[54] BALL SLIDE DESIGNED FOR EXTENDED TRAVEL

[75] Inventor: Richard O. Fry, Williamson, N.Y.

[73] Assignee: Automation Gages, Inc., Rochester, N.Y.

[21] Appl. No.: 674,125

[22] Filed: Mar. 25, 1991

[51] Int. Cl.$^5$ .............................................. F16C 29/04
[52] U.S. Cl. ...................................................... 384/49
[58] Field of Search ...................................... 384/49, 55

[56] References Cited

U.S. PATENT DOCUMENTS

| | | | |
|---|---|---|---|
| 2,672,378 | 3/1954 | McVey | 384/49 |
| 3,052,503 | 9/1962 | Pasinski | 384/49 |
| 3,113,807 | 12/1963 | Polidor | 384/49 |
| 3,145,065 | 8/1964 | Cator | 384/49 |
| 4,334,717 | 6/1982 | Polider | 384/49 |

FOREIGN PATENT DOCUMENTS

| | | | |
|---|---|---|---|
| 71036 | 5/1950 | Denmark | 384/49 |
| 60718 | 5/1980 | Japan | 384/49 |
| 611042 | 6/1978 | U.S.S.R. | 384/49 |

*Primary Examiner*—Thomas R. Hannon
*Attorney, Agent, or Firm*—Shlesinger, Fitzsimmons & Shlesinger

[57] ABSTRACT

The sliding member of a ball slide is supported for linear travel on a base member by two linear sets of ball bearings. In a typical embodiment each set of ball bearings has rolling engagement adjacent diametral opposite sides thereof with two pairs of spaced, parallel bearing rods that are housed, respectively, in longtitudinal grooves formed in confronting sides of the sliding member and base member, respectively. The spaces separating the two bearing rods of each pair thereof on the sliding member are equal to each other but greater than the spaces separating each pair of bearing rods on the base member, whereby for each revolution of a ball bearing the ball bearing will travel on the slide member at a rate lower than the rate of which the ball bearing will travel on the base member.

4 Claims, 3 Drawing Sheets

BALL SLIDE DESIGNED FOR EXTENDED TRAVEL

BACKGROUND OF THE INVENTION:

This invention relates to ball slides, and more particularly to an improved ball slide which permits extended travel of the female slide member relative to the supporting male member, as compared to conventional ball slides.

Conventional ball slides normally comprise a rectangularly shaped male or base member, and an inverted, generally U-shaped female section or slide member, which is supported on two sets of rollers or ball bearings for movement longitudinally of the base member. In a ball slide such as shown for example in U.S. Pat. No. 3,113,807, these two sets of bearings travel in two, laterally spaced raceways, which are located between a first pair of longitudinally extending grooves that are formed on the inside surfaces of the two furcations of the U-shaped slide member, and a second pair of longitudinally extending grooves that are formed in the opposed sides of the rectangular base member each to register with one of the grooves of the first pair. Each such groove contains a pair of spaced, parallel longitudinally extending bearing rods which define one side of a respective raceway. When ball bearings are employed, each set thereof is mounted for rotation in a conventional keeper plate or retainer, which is mounted for limited reciprocation between opposite ends of the slide member as the latter reciprocates on the base member.

Heretofore with ball slides of the type described it has been customary for opposite sides of each raceway, and the associated portions of the ball or roller bearing systems, to be similar or essentially mirror images one of the other. With this construction, as the saddle or slide member moves in one direction relative to the base member, each set of roller or ball bearings roll at opposite sides thereof along the associated pairs of bearing rods. This causes the two rods at one side of a raceway to engage or track against each ball bearing along the same circumferential paths as the two rods at the opposite side of the raceway. As a consequence, upon movement of one of the slide and base members relative to the other, the travel of each such member relative to the ball retainers will be the same. Moreover, the maximum length of travel of a member in one direction will be twice the travel of the retainers. Consequently, to obtain extra travel of the sliding or saddle member, it heretofore has been customary to lengthen the slide member to permit greater travel of the retainers or keepers relative to the slide member, or alternatively to shorten the ball keepers. The disadvantage of shortening the ball keeper is that the ball bearing systems are correspondingly shortened, and thus the stability of the ball slide may be reduced. On the other hand, lengthening the slide member often precludes use of the slide in applications where space restrictions require a short slide member.

It is an object of this invention, therefore, to provide an improved ball slide of the type described which permits extended travel of the sliding member or saddle relative to the base plate, as compared to conventional such ball slides, and without having to increase the length of the sliding member, or having to shorten the lengths of the ball keepers or retainers.

A more specific object of this invention is to provide a ball slide having two sets of ball bearings mounted between the slide member and its associated base plate in such manner that upon movement of the slide member the ball bearings impart a differential amount of travel as between the moving member and the ball bearing retainers.

Other objects of the invention will be apparent hereinafter from the specification and from the recital of the appended claims, particularly when read in conjunction with the accompanying drawings.

SUMMARY OF THE INVENTION

The inverted, generally U-shaped female sliding member of a ball slide is supported for linear travel on a rectangularly shaped base member by two linear sets of ball bearings, which travel in parallel raceways located adjacent and extending longitudinally of opposite sides of the base member. Each set of ball bearings has rolling engagement adjacent one diametral side thereof with a pair of spaced, parallel bearing rods that are housed in a longitudinal groove formed in one side of the male member, and adjacent the other diametral side thereof with another pair of spaced, parallel bearing rods that are housed in a longitudinal groove formed in the inside surface of the confronting furcation of the slide member. The spaces separating the two bearing rods in each of the sliding member furcations are equal to each other but greater than the equal spaces separating each pair of bearing rods in the male or base member.

With this construction, each of the two pairs of bearing rods in the sliding member is caused to engage one diametral side of the associated set of ball bearings along two circumferential paths or tracks which are spaced further apart than the two circumferential tracks followed by the two bearing rods that engage the diametral opposite sides of such ball bearings. It is this ratio or difference in spacing between the two sets of circumferential paths which causes the slide member to travel with respect to the ball bearings and their keepers at a rate slower than the balls travel with respect to the base member. Consequently, the slide member will travel faster (and further), with respect to the base member, than the keepers travel with respect to the slide member.

THE DRAWINGS

DETAILED DESCRIPTION OF THE PREFERRED EMBODIMENTS

Figure 1:
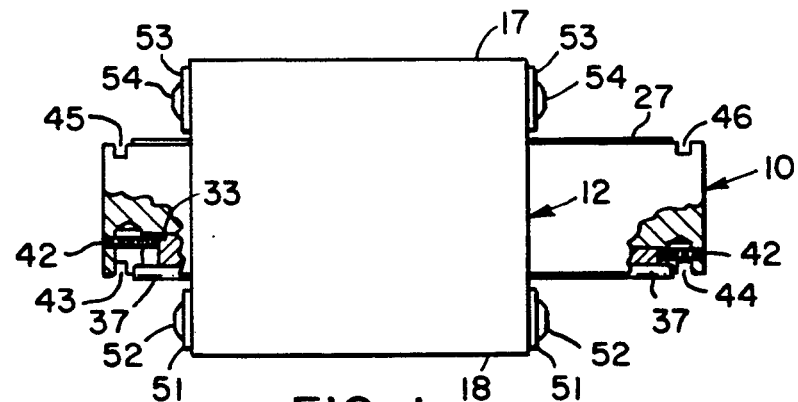
FIG. 1 is a plan view of a ball slide made according to one embodiment of this invention.
Figure 2:
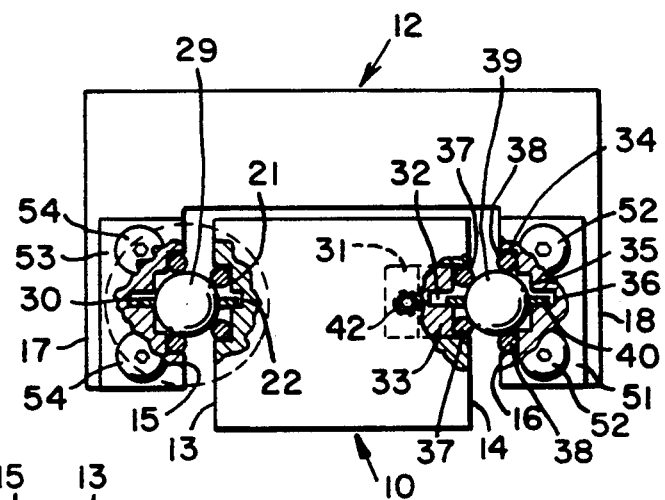
FIG. 2 is an end view of this slide with portions of both the male and female sections thereof being broken away and shown in section.
Figure 3:
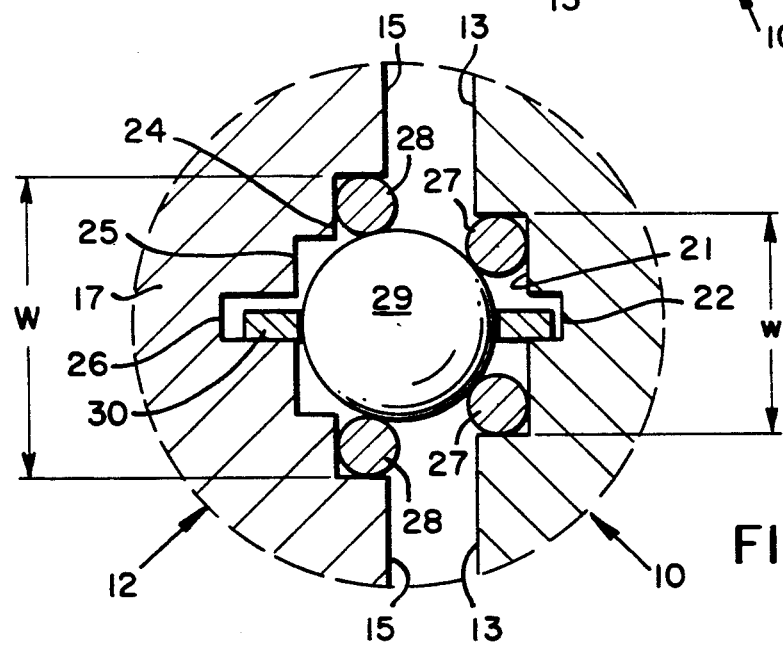
FIG. 3 is a greatly enlarged sectional view showing that portion of the ball slide in FIG. 2 which is encircled by the broken line.

Referring now to the drawings by numerals of reference, and first to FIGS. 1 to 4, the ball slide made according to one embodiment of this invention comprises two principal parts: an elongate, rectangularly shaped tongue or male member 10, and an inverted, generally U-shaped slide or female member 12. The base member 10 has plane, parallel, longitudinally extending side surfaces 13 and 14, the upper portions of which are disposed in spaced, confronting relation to the plane, parallel inside surfaces 15 and 16, respectively, of the downwardly extending furcations 17 and 18 of member 12. As shown more clearly in FIGS. 2 and 3, surface 13 of member 10 has formed therein a first, rather shallow but wide groove 21 which extends longitudinally of member 10, and a narrower but deeper groove 22, which is formed centrally in the bottom of groove 21 also to extend longitudinally of member 10. Referring to FIG. 3, wherein the dimensional width of the groove 21 is denoted by the letter w, it will be observed that the width of groove 22 is substantially less than that of groove 21.

Referring now to furcation 17, its inside surface 15 has therein a first, wide, longitudinally extending groove 24 the dimensional width of which is denoted in FIG. 3 by the letter W. A second, narrower but deeper groove 25 is formed centrally in the bottom of groove 24 to extend longitudinally thereof, and a third, still narrower and deeper longitudinally extending groove 26 which is formed in the bottom of groove 25. As shown in FIG. 3, the overall width W of groove 24 in the slide furcation 17 is substantially wider than the width w of the confronting groove 21 in surface 13 of the base member 10.

Seated in the two corners of the groove 21 in the base member 10, and extending longitudinally of this groove in vertically spaced, parallel relation to each other, are two cylindrically shaped bearing rods 27. Two similar rods 28 are seated in the corners of the groove 24 in surface 15 also to extend longitudinally of furcation 17 in vertically spaced, parallel relation to each other and to the rods 27. Each ball bearing 29 of a set of four thereof is mounted in one of four circular openings in a conventional keeper or ball retainer 30 to have tangential rolling engagement adjacent diametrally opposite sides thereof with the peripheral surfaces of the two sets of bearing rods 27 and 28. As shown more clearly in FIG. 3, marginal portions of the retainer 30 adjacent opposite sides thereof project into the registering grooves 22 and 26 in the surfaces 13 and 15, respectively, and are supported on the bottom surfaces of these grooves for limited sliding movement laterally and longitudinally of members 10 and 12.

At this point it is to be noted that the grooves in the inside surface 16 of the other furcation or leg 18 of the slide member 12 are mirror images of those formed in the surface 15. Referring to FIG. 2, the widest groove in surface 16 is denoted at 34, the next deeper and narrower groove is denoted at 35, and the deepest and narrowest groove is denoted by numeral 36. Also as in the case of the grooves in surface 15, the two corners of the widest groove 34 are occupied by cylindrically shaped, axially extending bearing rods 38.

The grooves in the surface 14 of the base member 10, however, are slightly different from those formed in surface 13. In surface 14, for example, there is formed a single, elongate, deep groove 31 in which is slidably seated an elongate gib 33 which has in its outer surface a longitudinally extending groove 32. The outer surface of the gib 33 is spaced slightly inwardly from the surface 14 on the base plate 10, thus forming right angular recesses in which are seated longitudinally extending, cylindrical bearing rods 37. Another set (four in all) of ball bearings 39 that are similar to bearings 29 are supported in a retainer 40 to have rolling engagement adjacent diametrally opposite sides thereof with the peripheral surfaces of the rods 37 and 38, in much the same manner as bearings 29 engage the rods 27 and 28.

Although not illustrated in detail herein, it is to be understood that the gib 33 has a tapered or slightly inclined inner surface which engages a correspondingly shaped or inclined surface formed at the bottom of groove 31, so that by shifting the gib 33 longitudinally in the groove 31 its outer surfaces, which are engaged with the bearing rods 37, will be adjusted radially of the ball bearings 39 selectively to increase or decrease the load thereon in much the same manner as is disclosed in the above-noted U.S. Pat. No. 3,113,807. For the purpose of adjusting the gib 33 longitudinally, set screws 42 are adjustably threaded into openings in opposite ends of the base member 10 to engage opposite ends, respectively, the gib 33. Thus by adjusting the screws 42 the gib 33 can be shifted longitudinally to pre-load or otherwise adjust the pressure exerted by the ball bearings 29 and 39 against the two sets of bearing rods 27, 28 and 37, 38, respectively.

Figure 4:
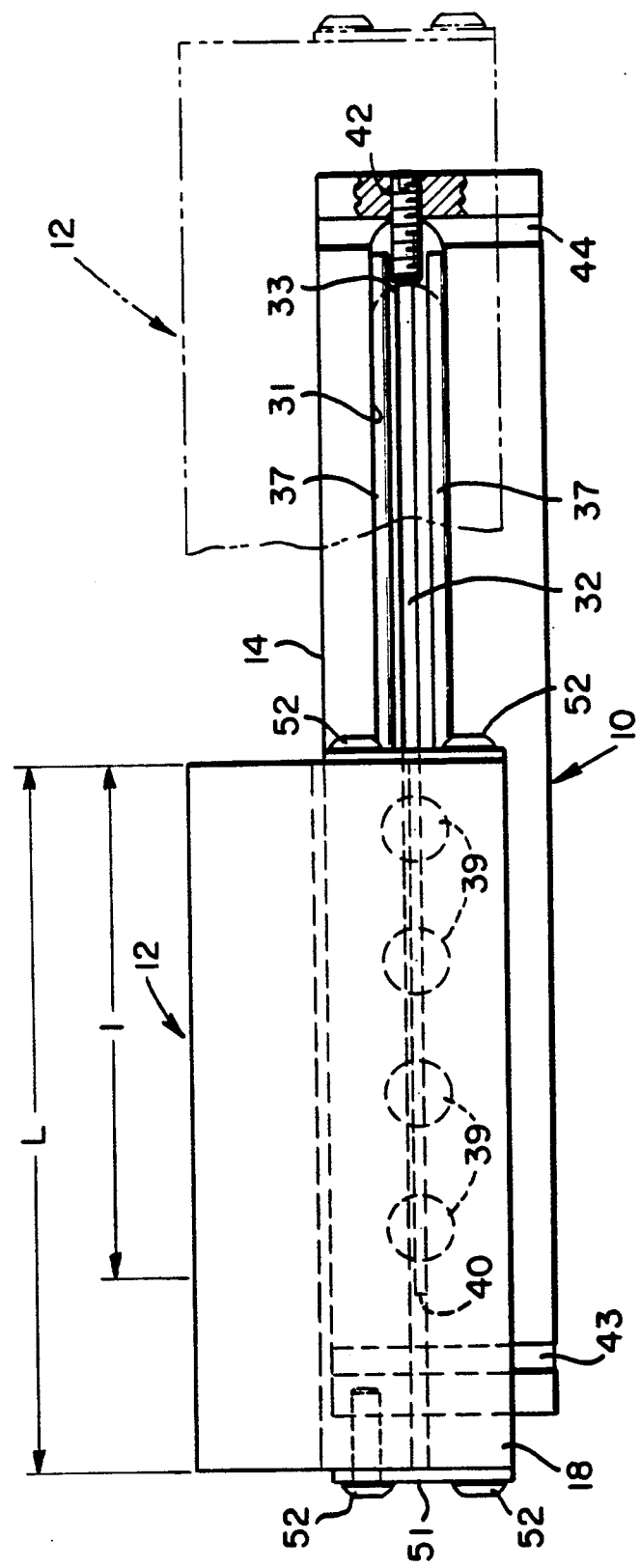
FIG. 4 is an enlarged, side elevational view of this ball slide when looking at the right side thereof as shown in FIG. 2, and with the female section thereof being shown by full lines in one of its two limit positions on the male section.

The groove 31 in the side 14 of the base member 10 extends almost the full length of the member, and opens at opposite ends thereof on vertically extending notches or grooves 43 and 44, which are formed in the surface 14 of the base member 10 adjacent opposite ends thereof, and at right angles to the groove 31. As shown in FIGS. 1 and 4, the bearing rods 37 also extend substantially the full length of the groove 31 and terminate adjacent the grooves 43 and 44, respectively. Although not illustrated, it is to be understood that the grooves 21 and 22 formed in the opposite side surface 13 of the base member 10 also extend substantially the full length thereof and open at opposite ends thereof on vertical grooves 45 and 46 which are formed in the surface 13 adjacent opposite ends thereof. Like the rods 37, the rods 27 also terminate adjacent opposite ends thereof on the vertical grooves 45 and 46.

Each set of grooves 24–26 and 34–36 extends the full length of its associated furcation 17 and 18, respectively. Grooves 34–36 are closed at opposite ends by a pair of end plates 51 that are secured by screws 52 to opposite ends of furcation 18; and opposite ends of grooves 24–26 likewise are closed by plates 53 (only one of which is shown in FIG. 1) that are secured by screws 54 to opposite ends of furcation 17. These end plates also retain rods 28 and 38 against axial movement in their associated grooves.

As shown in FIG. 4, the bearing retainer 40 is slightly less in overall length than the corresponding lengths of the grooves 32 and 36 in which it slides, and therefore is free to shift longitudinally between the end plates on member 12, although in a direction opposite to that in which member 12 moves. Note for example in FIG. 4 that when the slide member 12 has been advanced to its extreme left hand position relative to the base member 10, the right end of the keeper 40 will have engaged the inner surface of one of the end plates 51, which thus limits the extent to which keeper 40 can travel in this direction. Conversely, when member 12 is shifted to its other extreme position at the opposite end of member 10, as shown for example by broken lines in FIG. 4, the left hand end of the keeper 40 will engage the other end plate 51, which thus limits the movement of keeper 40 and its associated ball bearings 39 in this direction. Likewise, of course, although not illustrated, it will be apparent that the keeper 30 and its ball bearings 29 will travel in the same manner relative to member 12 between end plates 53.

Referring to FIGS. 2 and 3, and assuming again that the base member 10 is stationary so that slide member is movable relative thereto, it is to be understood that the grooves 21 and 31 have the same dimensional width w, and that the wider grooves 24 and 34 have the same dimensional width W. Consequently, rods 27 are vertically spaced from each other the same distance as rods 37, and rods 28 are vertically spaced from each other the same distance as rods 38. However, the significant difference as compared to prior art constructions is that the width W is greater than the width w. As a consequence, the rods 28 and 38 contact the balls 29 and 39 along significantly different circumferential paths when the balls are rotating.

For example, referring to FIG. 3, picture ball 29 as the earth which, when the slide member 12 is shifted longitudinally on member 10, will rotate about its vertical or polar axis. In such case the tracks formed on the ball 29 as it rolls on the rods 28 may be considered to approximate the arctic and antarctic circles, whereby the circumferences of the tracks are relatively small. On the other hand, the tracks formed on the ball 29 as it rolls against the rods 27, which are spaced closer together, will be closer to the imaginary equator or center of the ball, and may be considered to be equivalent to the Tropic of Cancer and the Tropic of Capricorn. These circumferential paths, therefore, are much larger than those corresponding to the paths created by engagement of the ball 29 with the rods 28. Because of these differences there will be a differential amount of travel of the balls 29 relative to the moving member 12 and the same balls relative to the stationary member 10. (The same would be true, of course, of the ball bearings 39.) In turn, as the slide member 12 travels longitudinally on the base member 10, for example from the right to the left in FIG. 4, the ball retainers or keepers 40 and 30 will travel from the left to the right relative to slide member 12, but at a rate slower than the rate at which member 12 moves on base member 10. The result of this phenomenon is that the overall travel of the slide member 12 on member 10 has been increased without having correspondingly increased the length of the slide member, or decreased the lengths of the keepers.

For example, in prior such ball slides the distance separating the axes of the two bearing rods of each set has been the same for all four sets. Consequently, as the slide member moves in one direction relative to the base member, the ball bearings of each set.. and their associated ball retainers move in their respective raceways at the same rate at which the slide member is moving. With applicant's invention, however, because the balls 29 and 39 roll on the rods 28 and 38 along circumferential paths substantially smaller than those paths along which the balls roll against rods 27 and 37, the keepers or retainers 30 and 40 will be caused to move in their respective raceways relative to the slide member 12 at a rate substantially slower than that of which member 12 is caused to move relative to the stationary member 10. As compared to prior art ball slides, therefore, for each rotation of the ball bearings 29, 39, the slide member 12 travels a further distance in one direction relative to member 10 than do the retainers 30 and 40 in the opposition direction.

In practice, by applying some basic trigonometry as between the ball bearings 29, 39, and the disposition of the rods 27, 28, and 37, 38, it is possible to design the travel as between the slide member 12 and the ball retainers 30, 40 in the ratio of, for example, 3:1. For example, assuming that the length L of the movable member 12, as denoted in FIG. 4, is four inches, and that the length 1 of each ball retainer 30, 40 is three inches, the keepers or retainers 30, 40 will then have one inch of space within which to travel between the end plates 51 and 53. Therefore, as the slide member 12 is moved from one limit position to the other, for example from the left to the right limit position as shown in FIG. 4, the ball bearings 29, 39, and hence the associated retainers 30, 40 will travel one inch relative to member 12, while the ball bearings will travel three times that amount on the stationary member 10, or three inches, thus resulting in a total travel of four inches of the moving member 12 on the base member 10.

Figure 5:
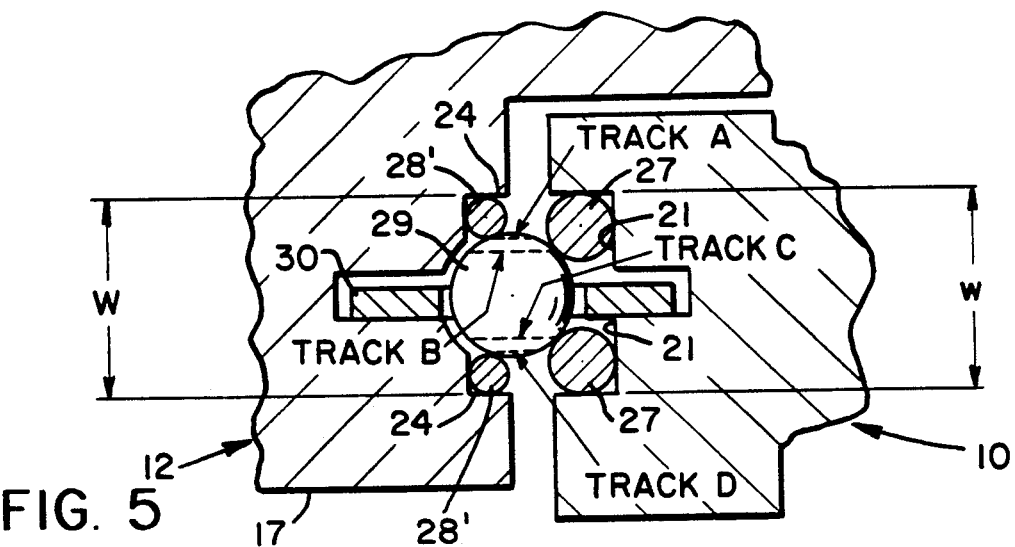
FIG. 5 is an enlarged, fragmentary sectional view generally similar to FIG. 3 but showing a modified form of this ball slide.
Figure 6:
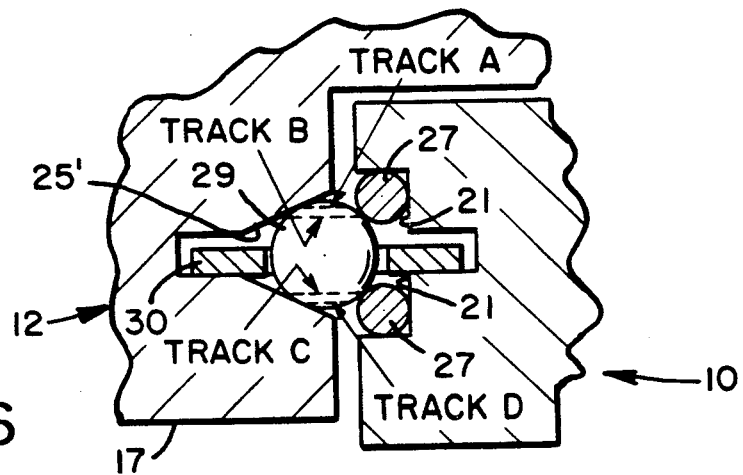
FIG. 6 is a view generally similar to FIG. 3 but showing still another modification of a ball slide made according to this invention.
Figure 7:
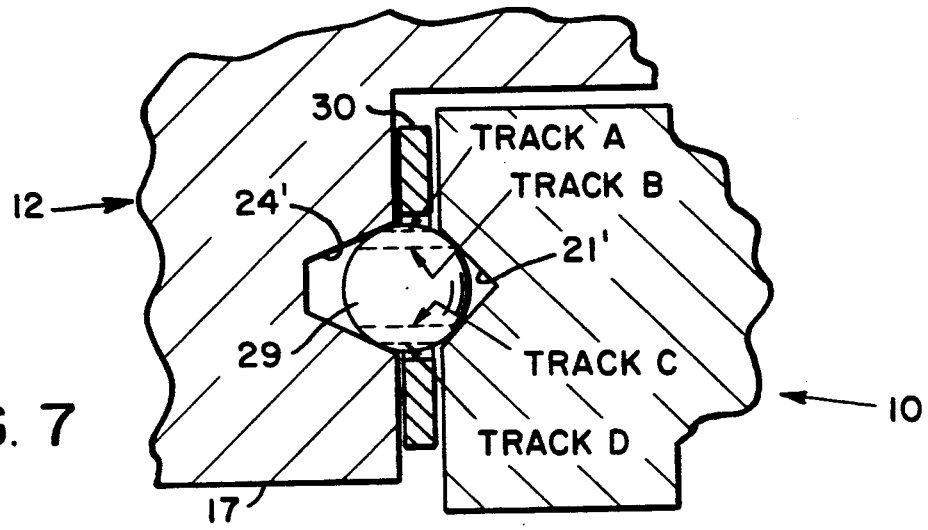
FIG. 7 is a view generally similar to FIG. 3 but showing a still further modification of this invention.

Referring now to the embodiments shown in FIGS. 5 to 7, wherein like numerals are employed to denote elements similar to those employed in the first embodiment, it will be noted that it is not always necessary to employ two like pairs of bearing rods to form a raceway for accommodating a retainer 30 and its ball bearings 29.

In FIG. 5, for example, although the confronting bearing rod supporting grooves 21 and 24 in the members 10 and 12, respectively, are equi-spaced as denoted by the dimensions W and w in this FIG., nevertheless the diameters of the rods 27 in the base member 10, are equal to each other but greater than the diameters of the rods 28' in the slide member 12. Consequently the balls 29 roll against rods 28' along circumferential tracks denoted by the broken lines A and D, and against rods 27 along circumferential tracks B and C, which are closer together than tracks A and D. Thus bearings 29 will travel on slide member 12 slower than they do on base member 10.

In FIG. 6 this same phenomenon is achieved by having each set of ball bearings roll at one diametral side thereof against a pair of bearing rods mounted in the usual manner on the base member 10, for example as each ball 29 will roll along tracks B and C against rods 27. At their diametrally opposite sides, however, the ball bearings of each set as represented for example in FIG. 6 by bearing 29, will roll tangentially along spaced tracks A and D against the two inclined surfaces of a V-shaped groove 25' which is formed in each inside surface of the furcations 17 and 18, respectively, to confront upon rods 27. Each ball bearing thus rolls tangentially against the rods 27 along tracks B and C, and against the inclined surfaces of groove 25' along tracks A and D.

In FIG. 7 this phenomenon is achieved by mounting each set of ball bearings in a raceway defined by two, elongate confronting, V-shaped grooves 21' and 24' formed in confronting surfaces on the support member 10 and slide member 12, repectively. This permits elimination of the bearing rods, and permits the ball bearings, such as for example bearing 29 in FIG. 7, to roll tangentially adjacent one diametral side along spaced tracks B and C against the two inclined surfaces defining groove 21' and ajacent its opposite side along tracks A and D against the inclined surfaces defining groove 24'. In this embodiment it will be noted that the keepers, such as keeper 30, are disposed to move in spaced, parallel planes between the two slide members rather than in a common plane as in the preceding embodiments. Also, it will be apparent that the points of tangential engagement of the sides of a respective groove 21' or 24' with a ball bearing can be altered simply by changing the slope of the sides defining the groove. Also, of course, such grooves can be milled or otherwise formed in the surface of a slide member easily and inexpensively.

From the foregoing, it will be apparent that the present invention provides a relatively simple and inexpensive means for extending the travel of the sliding member on the base member of a ball slide. Where heretofore the travel of the slide member on the base member has simply been a function of the difference between the lengths of the slide member and keepers (i.e., L-1), with applicant's invention this travel can now be adjusted in many different ways, for example, simply by changing (within practical limits) the difference between the groove widths W and w. or by using bearing rods of different diameters, or by forming the raceways from confronting generally V-shaped grooves and altering the slopes of the surfaces defining the grooves.

While retainers 30 and 40 have been shown to include four ball bearings each, it is obvious that more or less such balls may be used as required for a certain purpose. Moreover while in the first embodiment retainers 30 and 40 have been shown to lie in a plane extending normal to confronting surfaces 13, 15 and 14, 16, respectively, it will be apparent that they could be positioned parallel to these surfaces (see e.g. FIG. 7) without departing from this invention. And although in each embodiment 10 has been identified as the base member and 12 the slide member, it will be apparent either such member may be the fixed or stationary member. Also, if desired, the tracks (for instance B and C) formed by the bearing rods or other surfaces in the base member 10 could be spaced further apart than the tracks formed by the rods or other surfaces in the slide member 12.

Furthermore, while this invention has been illustrated and described in connection with only certain embodiments thereof, it will be apparent that it is capable of still further modification, and that this application is intended to cover any such modifications as may fall within the scope of one skilled in the art or the appended claims.

I claim:
1. A ball slide, comprising
a pair of elongate members, each having therein a pair of like, laterally spaced, longitudinally extending, parallel grooves,
means mounting one of said members for reciprocation longitudinally of the other member, and with the pair of grooves in said one member confronting upon and registering with the pair of grooves in said other member,
said means including a pair of spaced, parallel, cylindrical bearing rods mounted in and extending longitudinally of each of said grooves, and with the pair of bearing rods in each groove on said one member being disposed in spaced, confronting relation to the pair of rods in the confronting groove on said other member,
said means further including two linear sets of ball bearings each of which is mounted for limited reciprocation between a confronting pair of said grooves, and with the ball bearings of each set thereof having tangential rolling engagement with the bearing rods in the associated pair of said grooves, and
the diameters of said bearing rods on said one member being equal to each other, and the diameters of said bearing rods on the other of said members being identical but different than the diameters of said rods on said one member, whereby the rate of travel of said sets of ball bearings relative to said one member is different from said other member.
2. A ball slide as defined in claim 1, wherein
the depths of said grooves in said one member are less than the depths of said grooves in said other member, and
the diameters of said rods on said one member are smaller than the diameters of said rods in said other member.
3. A ball slide as defined in claim 2, wherein the axial centerlines of each pair of bearing rods on said one member are equi-spaced from each other a first distance which is different from the distance separating the axial centerlines of each pair of bearing rods on said other member.
4. A ball slide as defined in claim 3, wherein
each of said sets of ball bearings is housed for rotation in one of two elongate bearing retainers,
each of said retainers extends along each longitudinal side thereof slidably between a pair of said spaced bearing rods, and
means is provided for adjusting the lateral pressure exerted by said bearing rods on said ball bearings.

* * * * *